(12) United States Patent
Fein et al.

(10) Patent No.: US 9,335,890 B2
(45) Date of Patent: May 10, 2016

(54) METHOD AND APPARATUS FOR USER INTERFACE OF INPUT DEVICES

(71) Applicant: Genedics LLC, Lenox, MA (US)

(72) Inventors: Gene S. Fein, Oxnard, CA (US); Edward Merritt, Lenox, MA (US); Jackson T. Fein, Oxnard, CA (US)

(73) Assignee: Genedics LLC, Camarillo, CA (US)

( * ) Notice: Subject to any disclaimer, the term of this patent is extended or adjusted under 35 U.S.C. 154(b) by 0 days.

(21) Appl. No.: 14/794,080

(22) Filed: Jul. 8, 2015

(65) Prior Publication Data

US 2016/0026360 A1   Jan. 28, 2016

Related U.S. Application Data

(63) Continuation of application No. 14/246,374, filed on Apr. 7, 2014, now Pat. No. 9,110,563, which is a continuation of application No. 13/904,684, filed on May 29, 2013, now Pat. No. 8,730,165, which is a continuation of application No. 11/932,792, filed on Oct. 31, 2007, now Pat. No. 8,477,098.

(51) Int. Cl.

| | |
|---|---|
| *G06F 3/033* | (2013.01) |
| *G09G 5/08* | (2006.01) |
| *G06F 3/0481* | (2013.01) |
| *G06F 3/01* | (2006.01) |
| *G06F 3/03* | (2006.01) |
| *G06F 3/16* | (2006.01) |
| *G02B 27/00* | (2006.01) |
| *G03H 1/00* | (2006.01) |

(52) U.S. Cl.
CPC ........ *G06F 3/04815* (2013.01); *G02B 27/0093* (2013.01); *G03H 1/0005* (2013.01); *G06F 3/011* (2013.01); *G06F 3/0304* (2013.01); *G06F 3/167* (2013.01); *G03H 2001/0061* (2013.01)

(58) Field of Classification Search
CPC ............ G02B 27/0093; G03H 1/0005; G03H 1/2294; G03H 2001/0061; G06F 3/011; G06F 3/0304; G06F 3/04815; G06F 3/167
See application file for complete search history.

(56) References Cited

U.S. PATENT DOCUMENTS

| | | | |
|---|---|---|---|
| 4,593,967 | A | 6/1986 | Haugen |
| 4,818,048 | A | 4/1989 | Moss |
| 5,675,437 | A | 10/1997 | Hart et al. |
| 5,812,292 | A | 9/1998 | Garcia |
| 6,031,519 | A | 2/2000 | O'Brien |
| 6,147,773 | A | 11/2000 | Taylor et al. |

(Continued)

FOREIGN PATENT DOCUMENTS

| | | |
|---|---|---|
| EP | 1710665 A1 | 10/2006 |
| WO | WO 96/29677 | 9/1996 |

(Continued)

*Primary Examiner* — Charles Hicks (74) *Attorney, Agent, or Firm* — Hamilton, Brook, Smith & Reynolds, P.C.

(57) ABSTRACT

A 3 dimensional (3-D) user interface system employs: one or more 3-D projectors configured to display an image at a first location in 3-D space; one or more sensors configured to sense user interaction with the image and to provide user interaction information; and a processor configured (i) to receive the user interaction information from the one or more sensors; (ii) to correlate the user interaction with the image; and (iii) to provide one or more indications responsive to a correlation of the user interaction with the image, including displaying the image at a second location in 3-D space.

20 Claims, 7 Drawing Sheets

SYSTEM AND METHOD FOR HOLOGRAPHIC USER INTERFACE

(56) References Cited

U.S. PATENT DOCUMENTS

| | | |
|---|---|---|
| 6,211,848 B1 | 4/2001 | Plesniak et al. |
| 6,243,054 B1 | 6/2001 | DeLuca |
| 6,377,238 B1 | 4/2002 | McPheters |
| 6,388,657 B1 | 5/2002 | Natoli |
| 6,507,353 B1 | 1/2003 | Huard et al. |
| 6,611,786 B1 | 8/2003 | Zhang et al. |
| 6,650,318 B1 * | 11/2003 | Arnon .................. G03H 1/00 345/156 |
| 6,667,751 B1 | 12/2003 | Wynn et al. |
| 7,054,045 B2 | 5/2006 | McPheters et al. |
| 7,084,857 B2 | 8/2006 | Lieberman et al. |
| 7,185,271 B2 | 2/2007 | Lee et al. |
| 7,262,783 B2 | 8/2007 | Kramer et al. |
| 7,312,786 B2 | 12/2007 | Anderson et al. |
| 7,336,263 B2 | 2/2008 | Valikangas |
| 7,538,746 B2 | 5/2009 | Uhlhorn et al. |
| 7,634,741 B2 | 12/2009 | Klein |
| 7,844,599 B2 | 11/2010 | Kasperski et al. |
| 7,881,901 B2 | 2/2011 | Fein et al. |
| 8,127,251 B2 | 2/2012 | Fein et al. |
| 8,212,768 B2 | 7/2012 | Fein et al. |
| 8,294,749 B2 | 10/2012 | Cable |
| 8,319,773 B2 | 11/2012 | Fein et al. |
| 8,477,098 B2 | 7/2013 | Fein et al. |
| 8,730,165 B2 | 5/2014 | Fein et al. |
| 8,902,225 B2 | 12/2014 | Fein et al. |
| 9,110,563 B2 | 8/2015 | Fein et al. |
| 2002/0070921 A1 | 6/2002 | Feldman |
| 2002/0075240 A1 | 6/2002 | Lieberman |
| 2004/0095315 A1 | 5/2004 | Montellese |
| 2004/0106090 A1 | 6/2004 | Higgins et al. |
| 2004/0119746 A1 | 6/2004 | Mizrah |
| 2004/0193441 A1 | 9/2004 | Altieri |
| 2005/0002074 A1 | 1/2005 | McPheters et al. |
| 2005/0024324 A1 * | 2/2005 | Tomasi .................. G06F 1/1613 345/156 |
| 2005/0140660 A1 | 6/2005 | Valikangas |
| 2005/0277467 A1 | 12/2005 | Karabin et al. |
| 2005/0289472 A1 | 12/2005 | Morita et al. |
| 2006/0055993 A1 | 3/2006 | Kobayashi et al. |
| 2006/0098089 A1 | 5/2006 | Sofer |
| 2006/0167971 A1 | 7/2006 | Breiner |
| 2006/0229108 A1 | 10/2006 | Ceheinik |
| 2007/0055949 A1 | 3/2007 | Thomas |
| 2007/0130128 A1 | 6/2007 | Garg et al. |
| 2007/0169066 A1 | 7/2007 | Nielsen |
| 2007/0183012 A1 | 8/2007 | Cadet et al. |
| 2007/0211023 A1 | 9/2007 | Boillot |
| 2007/0266428 A1 | 11/2007 | Downes et al. |
| 2008/0005703 A1 | 1/2008 | Radivojevi et al. |
| 2008/0079723 A1 | 4/2008 | Hanson et al. |
| 2008/0231926 A1 | 9/2008 | Klug et al. |
| 2009/0102603 A1 | 4/2009 | Fein et al. |
| 2009/0109174 A1 | 4/2009 | Fein et al. |
| 2009/0109175 A1 | 4/2009 | Fein et al. |
| 2009/0109176 A1 | 4/2009 | Fein et al. |
| 2009/0109215 A1 | 4/2009 | Fein et al. |
| 2009/0113348 A1 | 4/2009 | Fein et al. |
| 2009/0184851 A1 | 7/2009 | Grego et al. |
| 2009/0267895 A1 | 10/2009 | Bunch |
| 2013/0038528 A1 | 2/2013 | Fein et al. |
| 2013/0257724 A1 | 10/2013 | Fein et al. |

FOREIGN PATENT DOCUMENTS

| | | |
|---|---|---|
| WO | WO 00/02187 | 1/2000 |
| WO | WO 2007/067970 A2 | 6/2007 |
| WO | WO 2009/039260 A2 | 3/2009 |

* cited by examiner

METHOD AND APPARATUS FOR USER INTERFACE OF INPUT DEVICES

RELATED APPLICATIONS

This application is a continuation of U.S. application Ser. No. 14/246,374, filed Apr. 7, 2014, which is a continuation of U.S. application Ser. No. 13/904,684, filed May 29, 2013, now U.S. Pat. No. 8,730,165, which is a continuation of U.S. application Ser. No. 11/932,792, filed Oct. 31, 2007, now U.S. Pat. No. 8,477,098. The entire teachings of the above applications are incorporated herein by reference.

BACKGROUND OF THE INVENTION

A graphical user interface (GUI) is a type of computer application user interface that allows people to interact with a computer and computer-controlled devices. A GUI typically employs graphical icons, visual indicators or special graphical elements, along with text, labels or text navigation to represent the information and actions available to a user. The actions are usually performed through direct manipulation of the graphical elements.

Holographic images can be created as single or consecutive images using available holographic technology. These technologies include mirrors, lasers, light and images strategically positioned to cause the proper reflection to yield a holographic image broadcast through an entry point in the laser and mirror positioning system. Black background and rooms with low or no light may enhance the appearance of the holographic image or images, which may also use a holographic plate as a display medium. Holographic systems may be large in size and spread out over a large broadcasting area or may be compact enough to fit in spaces smaller than a desk top. Holographic technology is only limited in size by the size of the component parts. By using holographic technology, images may be displayed multi-dimensionally, rather simply on a planar projection.

Currently progress has been made in technologies that can enhance the capability and range of holographic media in projects that employ multi-million mirror systems and via companies that have designed specialized high speed and high capacity micro processors for specialized jobs, other than holographic systems, where the technology could be applied to holographic technologies to make possible the proper positioning of millions of mirrors at a rate of between 24 to 60 or more frames of video per second, with corresponding synched audio.

Holographic displays generated over the last 20-year period utilize various configurations including lasers with images on glass plates such as an AGFA 8E75HD glass plate or other glass plates as well a laser such as a Spectra Physics 124B HeNe laser, a 35 mW laser diode system utilizing different processing methods such as pyrochrome processing. Split beam techniques can also be used Multi H1 to Multi H2. Such configurations as 8×10, triethanolomine, from Linotronic 300 image setter film are also commonly utilized or a configuration with rear-illuminated for 30×40 cm reflection hologram, where a logo floats 18-inches in front of the plate.

SUMMARY OF THE INVENTION

Some user interfaces have adopted a multi-dimensional interface approach. For example, the "heliodisplay" of IO2 Technology, LLC of San Francisco, Calif. projects images into a volume of free space, i.e. into an aerosol mixture such as fog or a gas, and may operate as floating touchscreen when connected to a PC by a USB cable. However, with the heliodisplay, the image is displayed into two-dimensional space (i.e. planar). While the Heliodisplay images appear 3 dimensional ("3-D"), the images are planar and have no physical depth reference.

Unfortunately, these existing uses have certain limitations in distribution and deployment. For example, functionally, the heliodisplay is a two dimensional display that projects against a curtain of air, or even glass. While, the heliodisplay may give the appearance of 3-D, the images displayed and the interface are 2-D. As such, the heliodisplay is not a true 3-D holographic display, and thus the interface operates on a two-dimensional plane, not taking advantage of a full three dimensional coordinate system.

Accordingly, there is a need for an integrated user interface that utilizes true 3-D technology to create a computing and multimedia environment where a user can easily navigate by touch, mouse or pointer system to effectively navigate the interface to raise the level of the user experience to a true 3-D environment, with the goal of attaining elements of the attenuated clarity, realism and benefits of that environment that match our day to day conventional interactions with the 3-D world. The present invention relates to the creation of a holographic user interface display system that combines physical media or digitally stored files with a digital holographic player hardware system. The result is the creation of a multimedia holographic user interface and viewing experience, where a variety of graphical schematics enabling cohesive access to information utilizing pyramids, blocks, spheres, cylinders, other graphical representations, existing templates, specific object rendering, free form association, user delegated images and quantum representations of information to form a user interface where the available tools combine over time to match a users evolving data and requests.

According to one aspect of the present invention, a system for a 3 dimensional (3-D) user interface comprises: one or more 3-D projectors configured to display an image at a first location in a 3-D coordinate system; one or more sensors configured to sense user interaction with the image and to provide user interaction information; and a processor configured (i) to receive the user interaction information from the one or more sensors; (ii) to correlate the user interaction with the image; and (iii) to provide one or more indications responsive to a correlation of the user interaction with the image. The one or more indications can comprise displaying the image at a second location in the 3-D coordinate system. The system can further comprise a communications port coupled to the processor and configured to provide communications interface with a computer system. The image can be a holograph. The user interaction with the image can comprise movement of the user relative to the image, or any sound produced by the user, or both. The one or more sensors can comprise any one or combination of location sensors, motion sensors, light sensors and sound sensors. The location sensors can comprise laser sensors configured to geometrically identify a position within the 3-D coordinate system. The light sensors can comprise any one or combination of photovoltaic sensors, image sensors and photo-electric light sensors. The sound sensors can comprise microphones. The image at the first location can cease to be displayed before, when or after the image at the second location starts to be displayed. The distance between the first location and the second location are within a range such that a sequential display of the image at the first location and the second location can be thought of as a movement of the image from the first location to the second location. The user interaction can comprise movement of the whole body or one or more body parts of the user from the first location to the second location, thereby creating an effect of the image moving from the first location to the second location responsive to the movement of the whole body or the one or more body parts of the user from the first location to the second location. The image can be displayed at the second location immediately after the whole body or the one or more body parts of the user moves to the second location, thereby creating an effect of the image moving with the whole body or the one or more body parts of the user. The image can be that of an input device for a computer, and the one or more indications can further comprise inputting data to the computer responsive to the correlation of the user interaction with the image. The data input to the computer can comprise data that are related or not related to the spatial difference between the first location and the second location in the 3-D coordinate system, or both. The input device can be selected from the group consisting of: mice, light guns, steering wheels, yokes, joysticks, directional pads, wired gloves, game controllers, game pads, game paddles and Wii remotes. The input device can be a mouse and the system can further comprise an image of a keyboard in the 3-D coordinate system or an actual keyboard.

According to another aspect of the present invention, a method for providing a 3 dimensional (3-D) user interface comprises: generating an image at a first location in a 3-D coordinate system; sensing user interaction with the image; correlating the user interaction with the image; and providing one or more indications responsive to a correlation of the user interaction with the image. The one or more indications can comprise displaying the image at a second location in the 3-D coordinate system. The image can be a holograph. The user interaction with the image can comprise movement of the user relative to the image, or any sound produced by the user, or both. Sensing can comprise using one or more laser sensors to geometrically identify a position within the 3-D coordinate system. Sensing can also comprise using a sound sensor to identify an audio input from the user. The image at the first location can cease to be displayed before, when or after the image at the second location starts to be displayed. The distance between the first location and the second location are within a range such that a sequential display of the image at the first location and the second location can be thought of as a movement of the image from the first location to the second location. The user interaction can comprise movement of the whole body or one or more body parts of the user from the first location to the second location, thereby creating an effect of the image moving from the first location to the second location responsive to the movement of the whole body or the one or more body parts of the user from the first location to the second location. The image can be displayed at the second location immediately after the whole body or the one or more body parts of the user moves to the second location, thereby creating an effect of the image moving with the whole body or the one or more body parts of the user. The image can be that of an input device for a computer, and the one or more indications can further comprise inputting data to the computer responsive to the correlation of the user interaction with the image. The data input to the computer can comprise data that are related or not related to the spatial difference between the first location and the second location in the 3-D coordinate system, or both. The input device can be selected from the group consisting of: mice, light guns, steering wheels, yokes, joysticks, directional pads, wired gloves, game controllers, game pads, game paddles and Wii remotes. The input device can be a mouse and the method can further comprise displaying an image of a keyboard in the 3-D coordinate system or providing an actual keyboard. The method can further comprise providing at least one of the provided indications to a device on a network.

According to still another aspect of the present invention, a computer readable medium has computer readable program codes embodied therein for causing a computer to provide a 3 dimensional (3-D) user interface. The computer readable program codes can cause the computer to: generate an image at a first location in a 3-D coordinate system; sense user interaction with the image; correlate the user interaction with the image; and provide one or more indications responsive to a correlation of the user interaction with the image. The one or more indications can comprise generating the image at a second location in the 3-D coordinate system. The image can be a holograph. The user interaction with the image can comprise movement of the user relative to the image, or any sound produced by the user, or both. Sensing can comprise using one or more laser sensors to geometrically identify a position within the 3-D coordinate system. Sensing can also comprise using a sound sensor to identify an audio input from the user. The image at the first location can cease to be displayed before, when or after the image at the second location starts to be displayed. The distance between the first location and the second location are within a range such that a sequential display of the image at the first location and the second location can be thought of as a movement of the image from the first location to the second location. The user interaction can comprise movement of the whole body or one or more body parts of the user from the first location to the second location, thereby creating an effect of the image moving from the first location to the second location responsive to the movement of the whole body or the one or more body parts of the user from the first location to the second location. The image can be displayed at the second location immediately after the whole body or the one or more body parts of the user moves to the second location, thereby creating an effect of the image moving with the whole body or the one or more body parts of the user. The image can be that of an input device for an electronic device, and the one or more indications can further comprise inputting data to the electronic device responsive to the correlation of the user interaction with the image. The data input to the electronic device can comprise data that are related or not related to the spatial difference between the first location and the second location in the 3-D coordinate system, or both. The input device can be selected from the group consisting of: mice, light guns, steering wheels, yokes, joysticks, directional pads, wired gloves, game controllers, game pads, game paddles and Wii remotes. The input device can be a mouse and the computer readable program codes can further cause the computer to generate an image of a keyboard in the 3-D coordinate system or to receive input from an actual keyboard. The computer readable program codes can further cause the computer to provide at least one of the provided indications to a device on a network.

Embodiments of the invention provide a holographic user interface which transforms the computing environment to enable a three dimensional holographic style user interface and display system. The system utilizes holographic projection technology along with programmed quadrant matrixes sensor field to create multiple methods to select and interact with data and user interface tools and icons presented in a holographic format. The system may be used for interconnecting or communicating between two or more components connected to an interconnection medium (e.g., a bus) within a single computer or digital data processing system.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The teachings of all patents, published applications and references cited herein are incorporated herein by reference in their entirety.

The present invention, in accordance with one embodiment relates to the creation of a holographic user interface which transforms the computing environment to enable a three dimensional (3-D) holographic style user interface and display system. The system utilizes holographic projection technology along with programmed quadrant matrixes sensor field to create multiple methods to select and interact with data and user interface tools and icons presented in a holographic format.

Systems related to holographic human machine interfaces have been previously described, e.g., in U.S. Pat. No. 6,031,519 entitled "Holographic Direct Manipulation Interface," in U.S. Pat. No. 6,377,238 entitled "Holographic Control Arrangement," and in U.S. Pat. No. 7,054,045 entitled "Holographic Human-Machine Interfaces," teachings of all of which are incorporated herein by reference in their entirety, respectively. For more details on a specific holographic input device, a holographic keyboard displayed on a flat surface is described in greater details in U.S. Patent Application Publication Number 20020070921 entitled "Holographic Keyboard," teachings of which is incorporated herein by reference in its entirety.

Figure 1:
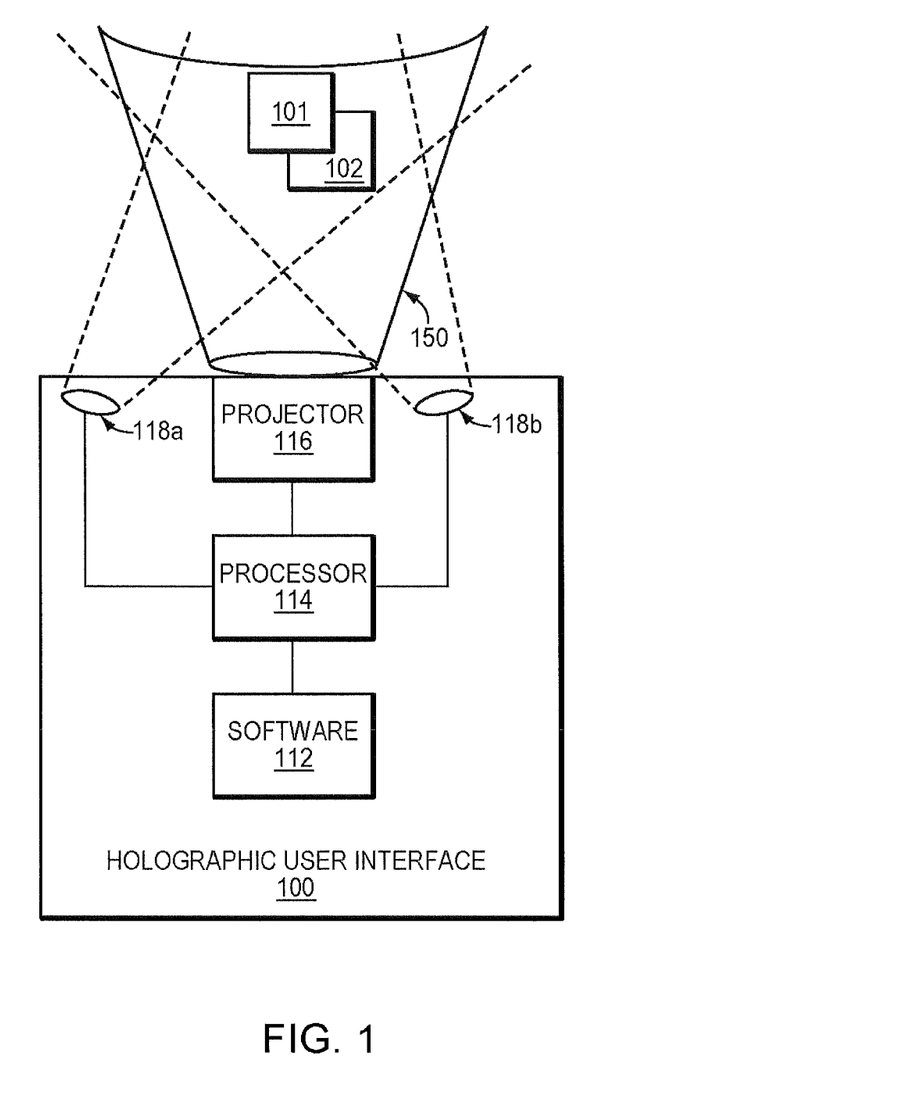
FIG. 1 is a block diagram illustrating a holographic user interface according to an embodiment of the present invention.

FIG. 1 illustrates a holographic user interface 100 according to one example embodiment of the present invention. The holographic user interface 100 includes a processor 114 that operates software 112, controls a holographic image projector 116, and processes information obtained from sensors 118a, 118b. The projector may generate a 3-D display image 101, 102 within a 3-D coordinate system 150. The sensors 118a and 118b may be directed toward the 3-D coordinate system to sense user interaction with images within the 3-D coordinate system. If a user were to interact with an image 101 or 102, the sensors 118a and 118b would provide coordinate information that the processor can correlate with the projected images 101 and 102 in the 3-D coordinate system.

Figure 2:
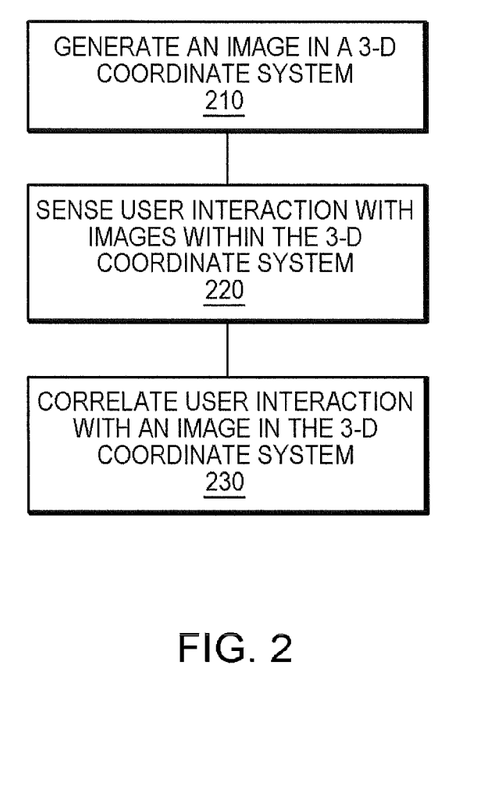
FIG. 2 is a flow chart diagram illustrating a method for providing a 3 dimensional (3-D) interface with a system.

FIG. 2 is a flow chart that illustrates the method for providing a 3 dimensional (3-D) interface with a system. The interface generates (210) an image in a 3-D coordinate system. In operation, an embodiment of the interface deploys holographic information in the form of a user interface template as a default once turned on. Sensors on the interface sense (220) a user's interaction with the 3-D coordinate system. The sensing may occur through the use of matrixes or triangulated data points that correspond to specific functions and data display which the system is capable of displaying. The interface may then correlate (230) the user's interaction with an image in the 3-D coordinate system. By sensing and correlating interaction with the 3-D coordinate system, the interface allows a computer system or display to interact with a user. The holographic data displayed by the system becomes a result of a selection process by the user who triggers data being displayed by key strokes or by the use of a three dimensional interactive interface. Users location commands are read by the system at their exact points and then the system deploys the appropriate response or holographic media based upon the users specific request made via the location of that request.

Figure 3:
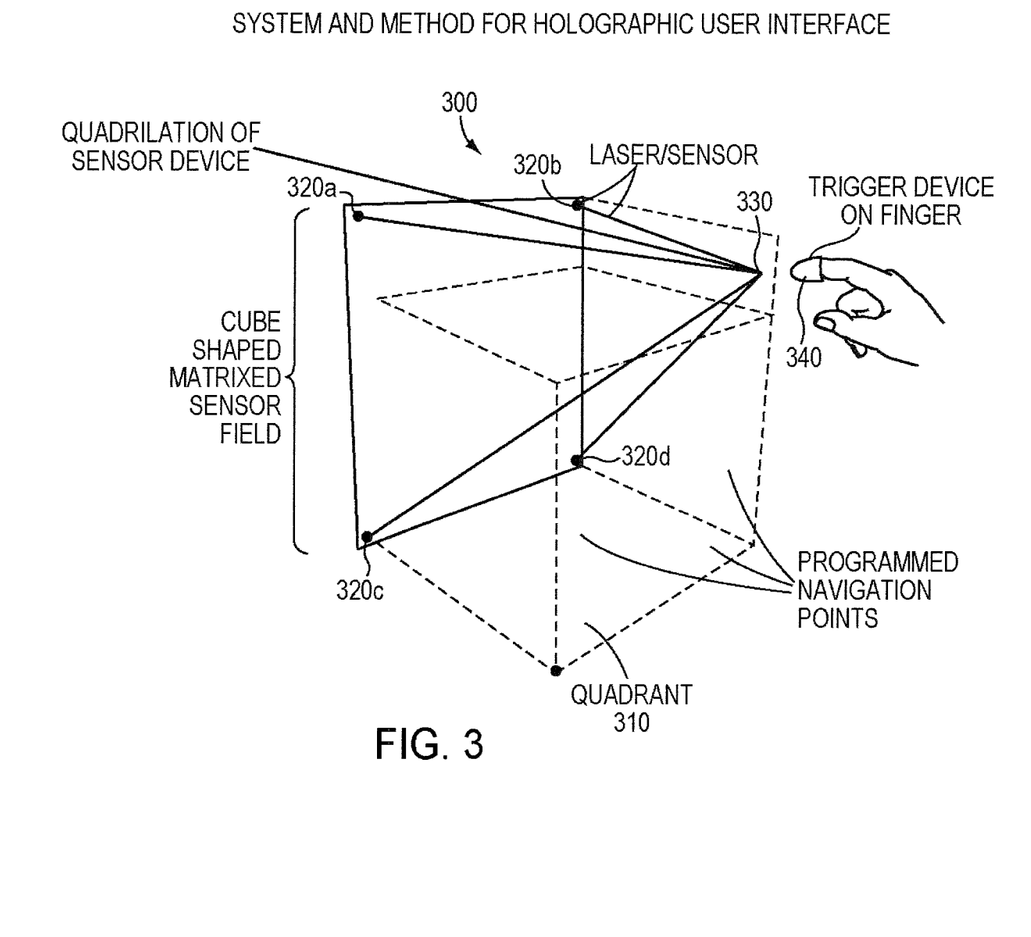
FIG. 3 is a perspective view of sensor field used in connection with embodiments of the present invention.

FIG. 3 illustrates a sensor field used in connection with embodiments of the present invention. The embodiment illustrated in FIG. 3 includes four laser sensors 320a-d. The manipulatable interface may be a relatable and interactive holographic media via the use of a sprocketed sensor system which deploys from the display either via a built in or retrofit hardware peripheral that creates a quadrilateral angle navigation system to determine the exact point 330 of a fingertip touch point 340 within a quadrant 310 (also referred to as a "3-D coordinate system"). This touch point, if effectively deployed by the user, is mapped to the image deployed by the holographic hardware and software system, as each image that is displayed in the system is displayed from an exacting point at an exacting place in space that has been preconfigured to match specific points on the quadrilateral sensor system. The points in space attached to programmed images are then matched to touch points made by the user. The touch point may trigger the same functions as a mouse and cursor.

One skilled in the art will recognize that other sensing configurations or devices may be used to sense a location within a 3-D coordinate system. For example, the sensors may be laser sensors configured to provide data to triangulate a point within the 3-D coordinate system, photo voltaic sensors, photo electric light sensors, or image sensors. The sensors may be programmed to identify the specific location of the touchpoint 330 that may extend through multiple planar images, to identify a single image located at a 3-D coordinate space.

Figure 4:
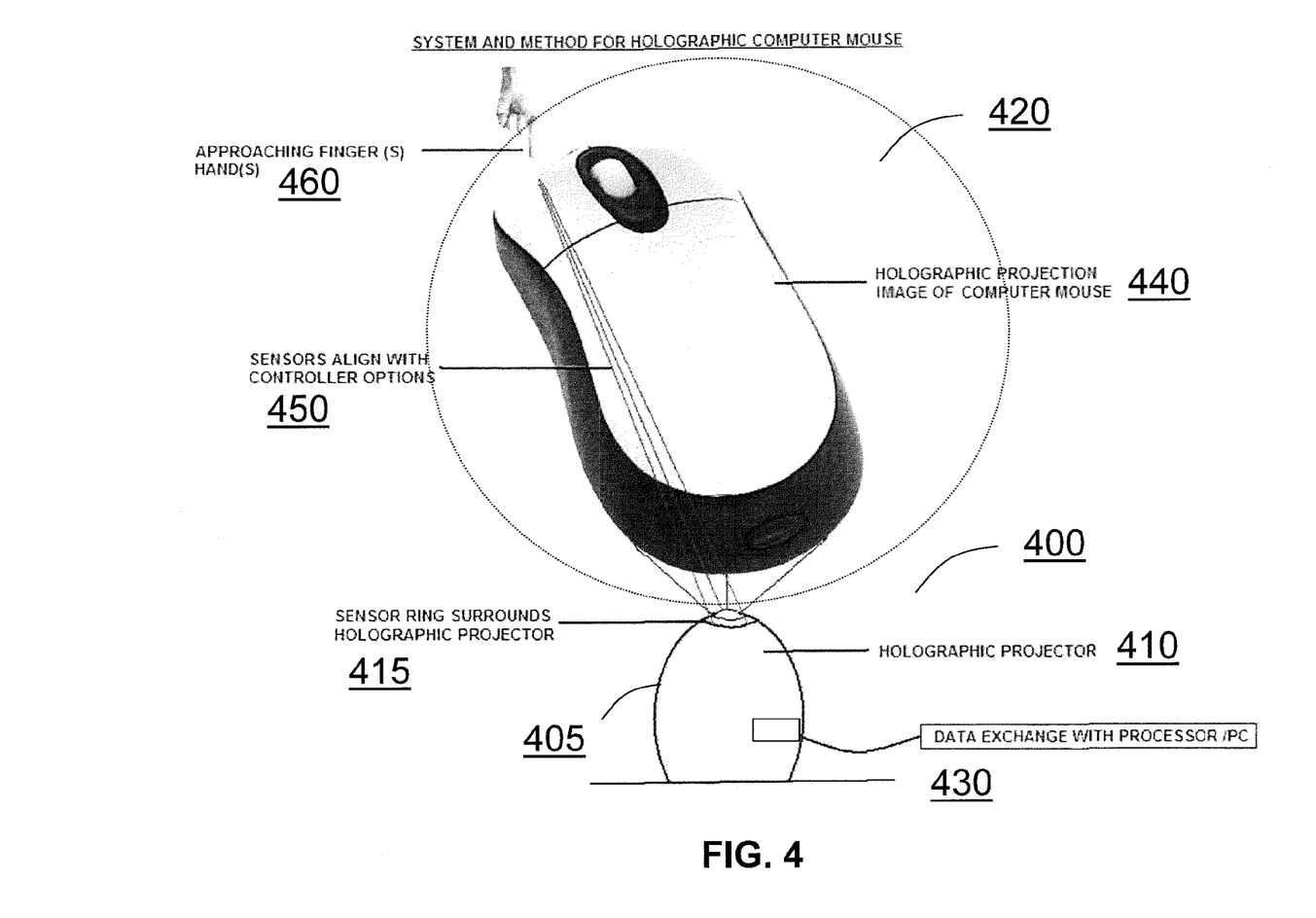
FIG. 4 is a front view of a holographic user interface device according to one embodiment of the present invention.

FIG. 4 illustrates a holographic user interface device 400 according to one embodiment of the present invention. The device 400 has a port 405 that may provide the output projector 410 for the multi-dimensional display, and also the sensors 415 for detecting user interaction. As illustrated in FIG. 4, a sensor ring 415 may surround a holographic projector 410. The projector 410 and sensors 415 map out a 3-D coordinate system 420 to serve as the holographic user interface. A communications port 430, such as a universal serial bus ("USB") port or wireless connection, serves to allow the device 400 to communicate with a computer system. Alternatively, device 400 may be embedded in a computer system.

The 3-D coordinate system may comprise an image of an input device 440. As illustrated in FIG. 4 as an example, the 3-D coordinate system comprises an image of a typical mouse 440. The sensors can align with controller options 450 of the mouse in the image and sense interaction with the image by approaching finger(s) and/or hand(s) 460. Any system that utilizes holographic displays may also be manipulated and selected using the sensor interface system.

Figure 5:
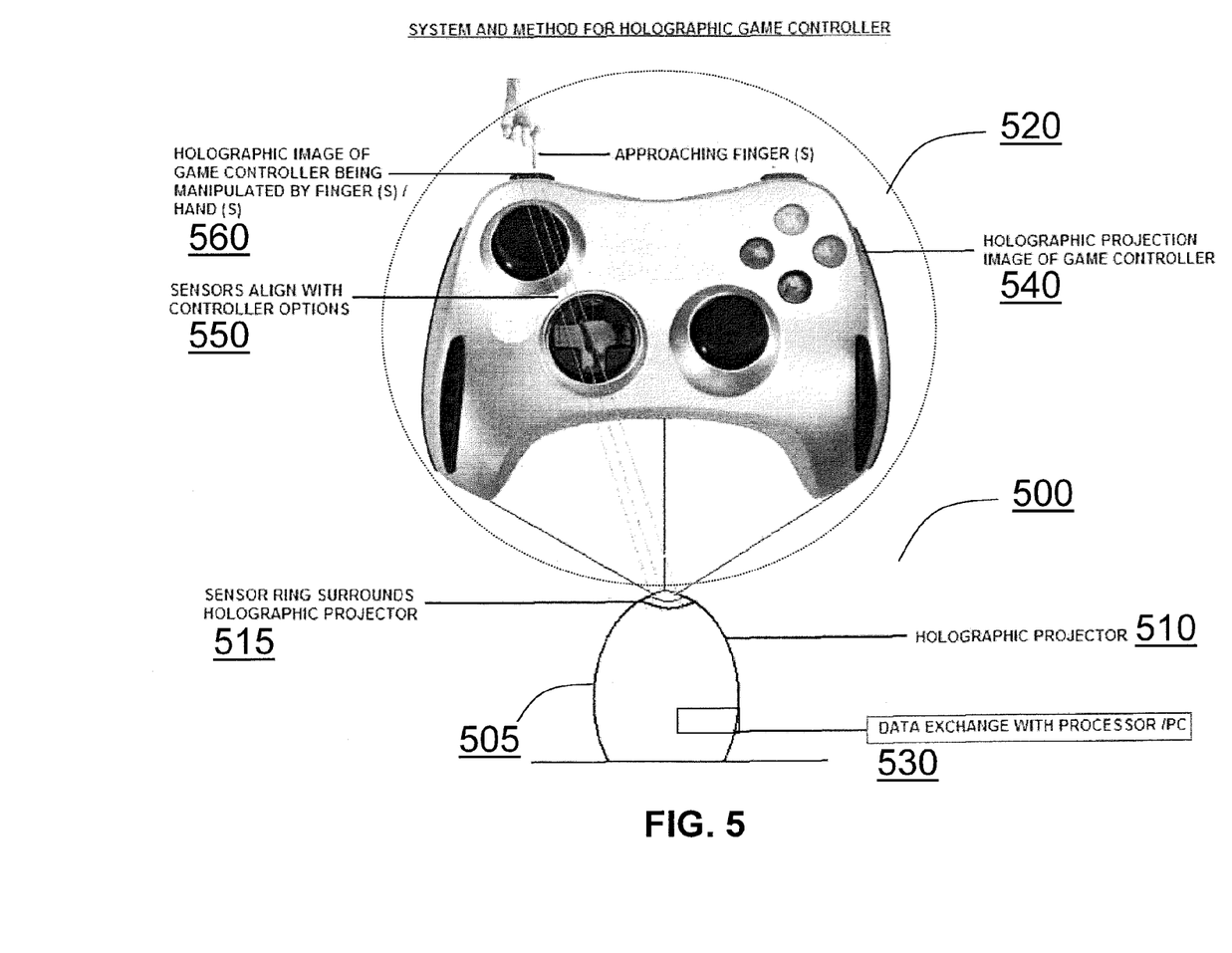
FIG. 5 is a front view of a holographic user interface device according to another embodiment of the present invention.

FIG. 5 illustrates a holographic user interface device 500 according to another embodiment of the present invention, where an image of a game controller is displayed. The device 500 has a port 505 that may provide the output projector 510 for the multi-dimensional display, and also the sensors 515 for detecting user interaction. As illustrated in FIG. 5, a sensor ring 515 may surround a holographic projector 510. The projector 510 and sensors 515 map out a 3-D coordinate system 520 to serve as the holographic user interface. A communications port 530, such as a universal serial bus ("USB") port or wireless connection, serves to allow the device 500 to communicate with a computer system. Alternatively, device 500 may be embedded in a computer system. The 3-D coordinate system may comprise an image of an input device 540. As illustrated in FIG. 5 as an example, the 3-D coordinate system comprises an image of a typical game controller 540. The sensors can align with controller options 550 of the game controller in the image and sense interaction with the image by approaching finger(s) and/or hand(s) 560. Any system that utilizes holographic displays may also be manipulated and selected using the sensor interface system.

As used herein, an "input device" is a hardware mechanism that transforms information in the external world for consumption by a computer. As used herein, a "computer" is any machine which manipulates data according to a list of instructions. Often, input devices are under direct control by a human user, who uses them to communicate commands or other information to be processed by the computer, which may then transmit feedback to the user through an output device. Input and output devices together make up the hardware interface between a computer and the user or external world. Input devices that can be displayed in the 3-D coordinate system according to the present invention include those that rely on mechanical motion as the modality of input. Non-limiting examples of such input devices include: keyboards, mice (many mice allow 2-D positional input, but some devices allow 3-D input, such as the Logitech Magellan Space Mouse, manufactured by Logitech of Fremont, Calif.), track ball (some trackballs are integrated into mice), touch pads, SpaceBall (6-degree-of-freedom controller developed by 3DConnexion of San Jose, Calif.), touch screens (touch screens may also function as visual output devices), graphics tablets (or digitizing tablets) that use styluses or fingers to input texts and/or drawings, light pens, light guns, steering wheels, yokes, jog dials, isotonic joysticks (e.g., analog sticks, where the user can freely change the position of the stick, with more or less constant force), isometric joysticks (e.g., pointing stick, where the user controls the stick by varying the amount of force they push with, and the position of the stick remains more or less constant), directional pads, wired gloves, ShapeTape (developed by Measurand Inc of Fredericton, Canada), and other haptic devices. Such input devices can be combined on a single physical device that could be thought of as a composite device. Many gaming devices have controllers (game controllers) like this, for example, game pads, game paddles and Wii remotes (manufactured by Nintendo of Redmond, Wash.).

User interaction with an image displayed in a 3-D coordinate system can comprise movement of the user relative to the image. The movement can be either discrete or continuous. Continuous movements can be either unidimensional or multi-dimensional. Accordingly, to sense the user interaction with the image, the sensors can comprise any one or combination of location sensors, motion sensors and light sensors. The location sensors can comprise laser sensors, which can be configured to geometrically identify a position within the 3-D coordinate system, e.g., by triangulation or quadrilation. Non-limiting examples of light sensors include photovoltaic sensors, image sensors and photo-electric light sensors.

Continuous movements can either be sensed by a plurality of sensors, each aligned to a fixed space within the 3-D coordinate system, or be sensed by one sensor or a plurality of sensors in combination, capable of scanning the entire 3-D coordinate system at a high speed. In the case of a plurality of sensors each aligned to a fixed space within the 3-D coordinate system, the spaces aligned with the sensors can be overlapping, contiguous or close enough to each other so that a continuous movement can be sensed by a plurality of sensors and digitized into a series of discrete movements at a high-resolution enough to be thought of continuous. In the case of one sensor or a plurality of sensors in combination capable of scanning the entire 3-D coordinate system at a high speed, the scanning speed can be high enough so that each change of position of the user above a certain limit (depending on the resolution of the sensor(s)) during a continuous movement can be captured by the sensor(s) as a different position and the continuous movement can be digitized into a series of discrete positions at a high-resolution enough to be thought of as a continuous movement. Sensor technology related to both cases are well known to those skilled in the art.

User interaction can also comprise any sound produced by the user. Such sound can be sensed by a sound sensor and correlated by a processor as an audio input from the user.

Certain input devices typically remain stationary during use. For example, a graphics tablet generally remains stationary while a user uses a stylus or a finger to move continuously over it to input texts and/or drawings. In these cases, the continuous input devices are stationary and the user movements (interactions with the continuous input devices) are continuous. Other input devices move, during use, for various reasons. Some devices need to move, in order for proper input functions to work. For example, mice move with the user's hand in order to direct a cursor across the screen of a computer monitor, Other devices can also move even though movement of these devices does not contribute to the input function. For example, a game controller can be made stationary when a user holds it, but it is more desirable for a game controller to be able to move with the user's hands during a game to provide increased convenience and entertainment for the user.

There are various was to generate a moving image within a 3-D coordinate system. For example, a moving image can either be generated by a plurality of projectors, each aligned to a fixed space within the 3-D coordinate system, or be generated by one projector or a plurality of projectors in combination, capable of changing the position of the projected image across the entire 3-D coordinate system. In the case of a plurality of projectors each aligned to a fixed space within the 3-D coordinate system, the spaces aligned with the projectors can be overlapping, contiguous or close enough to each other so that a series of overlapping, contiguous or close images can be generated in turn by different projectors. Provided that the distance between two images displayed consecutively is small enough, the series of images displayed can be high-resolution enough to be thought of as continuous movement of the image. Optionally, one can adjust the duration of time each image is displayed to provide a "hailing"

effect of the moving image. For example, a default situation can be that each image disappears the moment the next consecutive image shows up. However, one can delay the time before the first image disappears so that the two images can co-exist in the 3-D coordinate system for a given period of time. In this way, the moving image can have a trail behind it when it moves within the 3-D coordinate system. In the case of one projector or a plurality of projectors in combination capable of changing the position of the projected image across the entire 3-D coordinate system, the speed of changing can be high enough and the position of the changed image relative to the image preceding it can be small enough (depending on the resolution of the projector(s)) so that a series of consecutive changes of position of the image can be thought of as a continuous movement.

The sensors of the present invention can provide information about user interaction with an image displayed at a location in a 3-D coordinate system. A processor can receive such information, correlate the user interaction with the image and provide one or more indications responsive to a correlation of the user interaction with the image. The one or more indications can comprise displaying the image at a second location in the 3-D coordinate system. For example, when the sensing is based on location and movement of the user relative to the image, one or more sensors can sense touching of the image of a ball by the hand of a user. A processor can receive such information, correlate the user interaction with the image and display another image of the ball at a second location in the 3-D coordinate system opposite to the incoming direction of the touching hand, thereby creating an effect of the hand pushing the ball away. If the sensing is based on sound input, a user can produce a sound to a sound sensor, e.g., speak to a sound sensor, a processor can correlate this sound input with the image and display another image of the ball at a second location within the 3-D coordinate system based on the sound input. In the case of voice recognition, e.g., the user may speak "move up 3 inches," and the image of the ball can move up 3 inches in the 3-D coordinate system.

The image at the first location can cease to be displayed before, when or after the image at the second location starts to be displayed. In the case when the image at the first location ceases to be displayed before the image at the second location starts to be displayed, there will be a period of time during which no such image is displayed in the 3-D coordinate system. In the case when the image at the first location ceases to be displayed at exactly the time when the image at the second location starts to be displayed, the images at the two different locations do not coexist but there is always one such image in the 3-D coordinate system at any given time. In the case when the image at the first location ceases to be displayed after the image at the second location starts to be displayed, there will be a period of time during which the image is being displayed at both locations.

The distance between the first location and the second location can be within a range such that a sequential display of the image at the first location and the second location can be thought of a movement of the image from the first location to the second location. As used herein, "sequential" or "consecutive" refers to the fact that the image at the first location starts to be displayed earlier than the time the image starts to be displayed at the second location, and does not limit the time the image ceases to be displayed at the first location relative to the time the image starts to be displayed at the second location. If the distance between the two locations of the image is too short, then the change of the location of display may not be able to be perceived by a user as a movement of the image, i.e., the image may appear stationary. If the distance between the two locations of the image is too long, then the display of the image at the second location may be perceived as a separate event from the display of the image at the first location, rather than a movement of the image from the first location to the second location.

A series of such movements of the image within the 3-D coordinate system can be thought of as a continuous movement of the image across the 3-D coordinate system. If, for each movement within the series, the image ceases to be displayed at the first location after the image starts to be displayed at the second location, by adjusting the time it takes before the image ceases to be displayed at the first location after the image starts to be displayed at the second location, the system of the present invention can create a "trailing" effect of a continuous movement of the image across the 3-D coordinate system.

A movement of an image from a first location to a second location in a 3-D coordinate system can be responsive to the movement of the whole body or one or more body parts of a user from the first location to the second location in the 3-D coordinate system. The image can be displayed at the second location immediately after the whole body or the one or more body parts of the user moves to the second location, thereby creating an effect of the image moving with the whole body or the one or more body parts of the user. If the user's movement is continuous, a series of movements of the image in the 3-D coordinate system can be thought of as a continuous movement of the image across the 3-D coordinate system with the user.

The image can be that of an input device for a computer. Non-limiting examples of such input devices have been described above. According to the present invention, during a movement of a user across the 3-D coordinate system, and a responsive movement of an image of an input device with the user across the 3-D coordinate system, as described above, the user can interact with the image at any time during such movement. For example, a user can press and hold a button (actuator) on the image of a mouse while dragging the image of the mouse. Accordingly, one or more sensors can sense the relative position of the user's hand to the image of the mouse during its movement and a processor can correlate such information (determine if any button/actuator on the mouse is being pressed for any period of time during the movement of the mouse with the movement of the hand) and input data to a computer to which the system of the present invention can communicate or of which the system of the present invention is a part. For example, the location sensors can be aligned with each button on the mouse in the image displayed and sense the location of the finger relative to each button. A processor of the device 400 can receive such user interaction with the image and correlate the user interaction with the image, e.g., correlate the locations of the finger relative to each button to actions of pressing the buttons. For example, if the location of the finger is within a certain distance to a button or overlaps with the image of the button, then it is considered by the processor that the button is being pressed. Device 400 can communicate to a computer or can be part of a computer itself, i.e., the processor can operate device 400 or another device that communicates with device 400 in a manner responsive to a correlation of the user interaction with the image. For example, upon correlating user finger locations to pressing and holding the left button of the mouse as displayed when the hand moves across the 3-D coordinate system, device 400 can select and highlight some texts in the application Word in a computer, just as pressing and holding the left button of a mouse while dragging it would do. Device 400 does not have to be a computer by itself with the application Word installed, though, as long as it can provide or cause one or more other devices to provide the appropriate input functions to such a computer, via, for example, a USB or wireless interface.

In the case of a mouse and other applicable input devices, for which movement of the device by constitutes a form of input (e.g., dragging a mouse correlates to movement of a cursor on the screen, moving a Wii remote correlates to a movement in a computer game), the movement of an image of such input devices responsive to the movement of the user can result in data input in the absence of any other user interaction with the devices. In the case where movement of the device does not result in data input but provides convenience and/or enjoyment to the user during use of the device (e.g., a directional pad for video games), data input into the computer responsive to the user interaction with the image of the input device can be unrelated to the movement of the user across the 3-D coordinate system. For example, user input when interacting with an image of a directional pad can result only when the user presses appropriate buttons in the image of the directional pad, and not when the user holds the image of the directional pad and moves it with the hands. Therefore, the data input to the computer can comprise data that are related to or not related to the spatial difference between the first location and the second location in the 3-D coordinate system, or both.

Generation of a moving image responsive to user movement as described above can be one type of indication provided by a processor, so that the movement of the image can be responsive to the movement of the whole body or one or more body parts of the user. This can involve certain computational algorithms which, after calculation, can provide instructions to the projector(s) related to the position of a new image and the time the new image is displayed based on the positional change of the whole body or one or more body parts of the user within the 3-D coordinate system. Methods of developing such computational algorithms are well known to those skilled in the art.

For example, an image of a mouse can move with the hand holding it across the 3-D coordinate system. At the same time, the track of the mouse, which is the same track as that of the moving hand, which in turn can be determined by one or more sensors, can be determined. A processor can receive such information (track of the moving hand), correlate it with the perceived track of the mouse and provide one or more indications, among which can be moving of a cursor accordingly on a computer screen.

Figure 6:
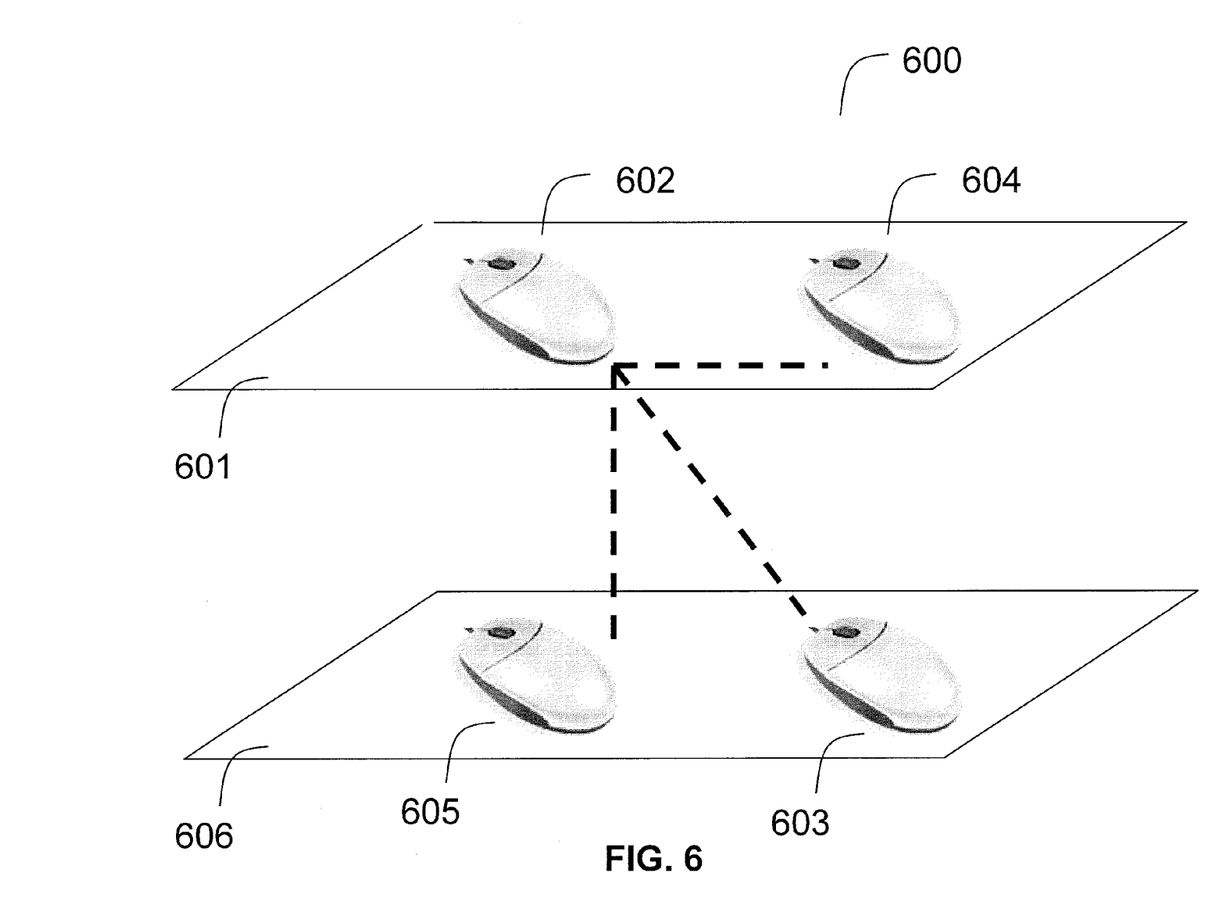
FIG. 6 is a perspective view of a holographic user interface device and its track of movement in a 3-D coordinate system according to one embodiment of the present invention.
Figure 7:
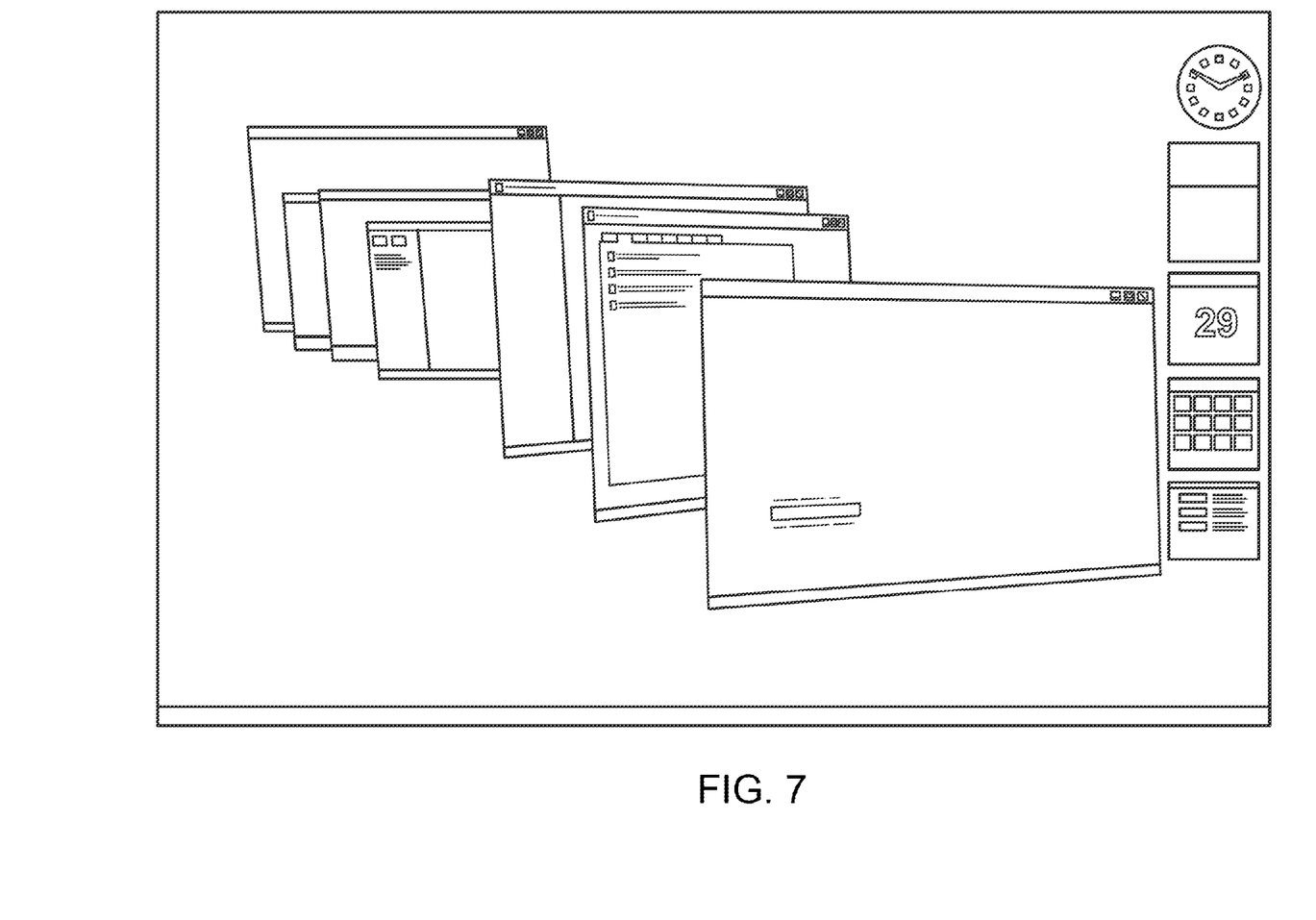
FIG. 7 is a front view of a computer screen showing an operating system desktop in which a holographic mouse can be used to navigate and select items quickly and easily

One issue exists with tracking the movement of an image of an input device in a 3-D coordinate system that is conventionally thought of as a device moving only two-dimensionally, e.g., a mouse. As illustrated in FIG. 6, the image of a mouse 602 is conventionally thought to move in a plane 601 in a 3-D coordinate system 600. If the image 602 moves to a location that is not within plane 601, e.g., to location 603 as illustrated in FIG. 2, such movement can be computationally broken down into two separate movements, one movement within plane 601 to location 604, the other vertical to plane 601 to location 605, wherein both locations 603 and 605 are within a plane 606 that is parallel to plane 601. A processor may determine that only the track from location 602 to location 604 within plane 601 contributes to the input data, e.g., movement of a cursor on a computer screen. Depending on the computational algorithms used and the types of input data the computer can receive and/or its software can accept, the track from location 602 to location 605 that is vertical to plane 601 may also contribute to data input. This is especially useful for the newest operating systems that are capable of simulating a 3-D environment on the desktop in a computer's monitor. For example, "Windows Flip 3D" developed by Microsoft Corporation (Redmond, Wash.) and provided in Premium, Business and Ultimate editions of Windows Vista®, creates a view of open windows in a 3-D stack on the desktop (FIG. 7). Windows Flip 3D allows a user to use the Windows logo+ TAB keys in order to "flip" through the open windows to quickly locate and select the window one wants. Software applications that can accept data related to the vertical movement or the vertical element of the movement of an image of a mouse (e.g., the vertical track from location 602 to location 605, broken down from the movement of the mouse from location 602 to location 603, as illustrated in FIG. 6) in a 3-D coordinate system according to the present invention can allow a user to directly locate the window one wants without having to flip through the stack of windows. Another exemplary situation where the vertical movement or the vertical element of the movement of an image of a mouse can contribute to data input is in the realm of computer-assisted design, where movement of a mouse in a 3-D coordinate system can directly result in input of spatial data in designing 3-D structures.

User interaction with the image of an input device can also comprise any sound produced by the user. Such sound can be sensed by a sound sensor and correlated by a processor as an audio input to, e.g., device 400. Either device 400 or another device to which device 400 can communicate can convert and/or transmit the audio input. For example, an audio input can be in the form of a voice command, wherein the processor can correlate the voice command (voice recognition) and operate device 400 or a device that communicates with it in a manner as dictated by the voice command. The operation dictated by the voice command, however, is preferably related to a function of the input device as displayed in the image, e.g., a user may use voice command to drag a mouse if the input device displayed in the image is a mouse. This can provide great convenience for people with impaired mobility, By providing voice command, the user can visualize the movement and/or clicking of the mouse across the 3-D coordinate system without physically interacting with the image, while at the same time, the movement and/or Clicking of the mouse image correlates with corresponding data input into the computer.

The 3-D image of the input device according to the present invention essentially becomes a virtual input device for any system that requires such input device, especially when the input device typically moves during use. The 3-D image of the input device can be used together with other input devices or images of other input devices simultaneously, either in association or independently, in the same system. For example, the system can also display a holographic image of a keyboard in the same 3-D coordinate system in which a holographic mouse is displayed. The holographic keyboard can serve as a virtual keyboard and the holographic mouse can serve as a virtual mouse, both contributing to data input to a computer. The holographic keyboard is further explained in details in U.S. patent application Ser. No. 11/932,731, filed Oct. 31, 2007, entitled "Digital, data, and multimedia user interface with a keyboard" by Gene S. Fein and Edward Merritt, the teaching of which is incorporated herein by reference in its entirety. Alternatively, the 3-D image of a mouse can be the sole virtual input device for a computer, while the computer can still have an actual keyboard. Therefore, the virtual input devices of the present invention can either work independently, or in tandem with any other virtual or actual input devices. There are numerous advantages for having a virtual input device in addition to the ones described above.

Sometimes the actual devices are too big to carry and affect mobility of the users needing them. Instead of using the actual device, those people can interact with the 3-D image of the device generated by a much smaller device on the go without having to worry about where to store the actual, bigger device. Sometimes people with visual impairment or other disabilities may find certain input devices too small to operate. The system according to the present invention can provide a 3-D image of the continuous input device much larger than the actual device, Instead of using the actual device, those people can interact with the 3-D image of the device much more easily.

Those of ordinary skill in the art should recognize that methods involved in providing a 3-D user interface with a system may be embodied in a computer program product that includes a computer usable medium. For example, such a computer usable medium can include a readable memory device, such as a solid state memory device, a hard drive device, a CD-ROM, a DVD-ROM, or a computer diskette, having stored computer-readable program code segments. The computer readable medium can also include a communications or transmission medium, such as electromagnetic signals propagating on a computer network, a bus or a communications link, either optical, wired, or wireless, carrying program code segments as digital or analog data signals. The program code enables and supports computer implementation of the operations described in FIGS. 1 and 2 or other embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A system for a 3 dimensional (3-D) user interface, the system comprising:
   one or more 3-D projectors configured to display an image at a first location in a 3-D coordinate system;
   one or more sensors configured based on quadrilateral angle navigation to sense user interaction with the displayed image and to provide user interaction information; and
   a digital processor configured:
   (i) to receive the user interaction information from the one or more sensors,
   (ii) to correlate the user interaction with the image, and
   (iii) to provide one or more indications responsive to a correlation of the user interaction with the image, wherein the one or more indications comprise displaying the image at a second location in the 3-D coordinate system,
   wherein the displayed image is displayed from one or more points in the 3-D coordinate system that are at least one of configured and preconfigured to correspond to at least one point sensed by the one or more sensors.

2. The system of claim 1, further comprising a communications port coupled to the processor and configured to provide communications interface with a computer system.

3. The system of claim 1, wherein the displayed image is regulated via system settings that include continuously tracking a stylus by the one or more sensors, the tracking within at least one area associated with the 3-D coordinate system.

4. The system of claim 1, wherein the projectors are configured to display the image as a 3-D display, in a static state.

5. The system of claim 1, wherein the displayed image comprises a 3-D image in a static state where the 3-D image is displayed in the first location disappears when the 3-D image is moved by the processor to the second position.

6. The system of claim 1, wherein the displayed image comprises a 3D image in a static state where the 3D image is displayed in the first position forms a trailing continuous motion effect when the 3D image is moved via the processor to the second position.

7. The system of claim 1, wherein the displayed image comprises a 3-D display of a series of images where the duration of time that each image in the series is displayed is regulated by the system.

8. The system of claim 1, wherein the displayed image comprises one or more 3-D images displayed simultaneously.

9. The system of claim 1, wherein the displayed image comprises multiple 3-D images controlled by voice commands where at least one of the multiple 3-D images is controlled by voice commands.

10. The system of claim 1, wherein the displayed image comprises one or more 3-D images controlled by voice commands where at least one of the 3-D images is controlled by system 3-D devices.

11. The system of claim 1, wherein the displayed image comprises 3-D images controlled by voice commands where at least one of multiple 3-D images is controlled by voice commands in tandem with system 3-D devices.

12. The system of claim 1, wherein the displayed image comprises 3-D images displayed from one or more software programs.

13. The system of claim 1, wherein the one or more sensors include at least one of: a location sensor, a motion sensor, and a light sensor.

14. A system for a 3 dimensional (3-D) user interface, the system comprising:
   one or more 3-D projectors configured to display an image at a first location in a 3-D coordinate system; and
   a plurality of sensors configured based on quadrilateral angle navigation to sense user interaction with the displayed image, two or more of the plurality of sensors sensing the user interaction including continuous movements, the two or more of the plurality of sensors configured to scan the 3-D coordinate system, and
   a digital processor configured:
   (i) to receive the user interaction information from the two or more of the plurality of sensors,
   (ii) to correlate the user interaction with the image, and
   (iii) to provide one or more indications responsive to a correlation of the user interaction with the image, wherein the one or more indications comprise displaying the image at a second location in the 3-D coordinate system.

15. The system of claim 14, wherein the plurality of sensors include at least one of: a location sensor, a motion sensor, and a light sensor.

16. The system of claim 14, wherein the plurality of sensors includes one or more laser sensors, the one or more laser sensors being configured to geometrically identify a position within the 3-D coordinate system based upon triangulation or quadrilation.

17. The system of claim 14, wherein the plurality of sensors includes one or more light sensors, the one or more light sensors including at least one of: a photovoltaic sensor, an image sensor and a photo-electric light sensor.

18. A system for a 3 dimensional (3-D) user interface, the system comprising:

one or more 3-D projectors configured to display a moving image at a first location in a 3-D coordinate system; and one or more sensors configured based on quadrilateral angle navigation to sense user interaction with the displayed moving image and to provide user interaction information; and a digital processor configured:
  (i) to receive the user interaction information from the one or more of sensors,
  (ii) to correlate the user interaction with the moving image, and
  (iii) to provide one or more indications responsive to a correlation of the user interaction with the moving image, wherein the one or more indications comprise displaying the moving image at a second location in the 3-D coordinate system.

19. The system of claim 18, wherein the one or more 3-D projectors include two or more 3-D projectors that are configured to change the position of display of the moving image at a first location in the 3-D coordinate system, each one of the two or more 3-D projectors being aligned to a fixed space within the 3-D coordinate system.

20. The system of claim 18, wherein the user interaction includes at least one of: user interaction with a physical apparatus or user interaction based upon a voice of the user.

* * * * *